(12) United States Patent
Berkema et al.

(10) Patent No.: US 7,321,443 B2
(45) Date of Patent: Jan. 22, 2008

(54) PRINT DEVICE AND PROGRAM PRODUCT FOR SUPPORTING PRINT BY REFERENCE METHODS

(75) Inventors: Alan C. Berkema, Granite Bay, CA (US); Jeff Morgan, Cupertino, CA (US); Pat Stoltz, San Diego, CA (US); Todd Fischer, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 835 days.

(21) Appl. No.: 09/897,816

(22) Filed: Jun. 29, 2001

(65) Prior Publication Data

US 2003/0002073 A1    Jan. 2, 2003

(51) Int. Cl.
*G06K 15/00*    (2006.01)

(52) U.S. Cl. .................... 358/1.16; 358/1.15; 358/1.14

(58) Field of Classification Search ............... 358/1.15, 358/403, 1.16; 709/229, 219, 217, 218, 238
See application file for complete search history.

(56) References Cited

U.S. PATENT DOCUMENTS

| | | | |
|---|---|---|---|
| 5,539,665 A | | 7/1996 | Lamming |
| 5,828,855 A | * | 10/1998 | Walker ........................ 710/305 |
| 5,848,413 A | * | 12/1998 | Wolff .......................... 707/10 |
| 5,862,321 A | | 1/1999 | Lamming |
| 5,915,214 A | | 6/1999 | Reece |
| 5,974,416 A | | 10/1999 | Anand |
| 6,173,407 B1 | | 1/2001 | Yoon |
| 6,184,996 B1 | | 2/2001 | Gase |
| 6,189,788 B1 | | 2/2001 | Sherman |
| 6,324,521 B1 | | 11/2001 | Shiota |
| 6,347,340 B1 | | 2/2002 | Coelho |
| 6,379,058 B1 | * | 4/2002 | Petteruti et al. ............... 400/76 |
| 6,400,272 B1 | | 6/2002 | Holtzman |
| 6,407,820 B1 | * | 6/2002 | Hansen et al. ............. 358/1.12 |
| 6,448,906 B1 | | 9/2002 | Nachtsheim |
| 6,452,689 B1 | | 9/2002 | Srinivasan |
| 6,501,832 B1 | | 12/2002 | Saylor |
| 6,574,266 B1 | * | 6/2003 | Haartsen ..................... 375/133 |
| 6,601,102 B2 | * | 7/2003 | Eldridge et al. ............ 709/229 |
| 6,738,841 B1 | | 5/2004 | Wolff |
| 6,744,528 B2 | | 6/2004 | Picoult |
| 6,757,749 B2 | * | 6/2004 | Aoki et al. .................... 710/5 |

(Continued)

FOREIGN PATENT DOCUMENTS

EP    0886206    12/1998

(Continued)

OTHER PUBLICATIONS

Dictionary.com*

(Continued)

*Primary Examiner*—Jerome Grant, II (57) ABSTRACT

A print device for printing data for a client comprises a wireless communications port for receiving a reference communicated from the client, with the reference comprising at least a location for print content. The print device further comprises a network communications port for communicating with the location to obtain the print content. The invention further comprises a program product embodiment for causing a print device to receive a reference from a client and to obtain print content from a location indicated by the reference.

15 Claims, 5 Drawing Sheets

U.S. PATENT DOCUMENTS

| | | |
|---|---|---|
| 6,772,338 B1 | 8/2004 | Hull |
| 6,778,289 B1 * | 8/2004 | Iwata .................. 358/1.15 |
| 6,782,542 B1 | 8/2004 | Mein |
| 6,785,542 B1 * | 8/2004 | Blight et al. ............. 455/426.1 |
| 6,842,460 B1 | 1/2005 | Olkkonen |
| 6,857,023 B2 | 2/2005 | Rivadalla |
| 2001/0008837 A1 * | 7/2001 | Takahashi ................... 455/403 |
| 2001/0016921 A1 | 8/2001 | Takata |
| 2001/0037462 A1 * | 11/2001 | Bengtson ................... 713/201 |
| 2001/0048533 A1 * | 12/2001 | Koana ..................... 358/1.15 |
| 2002/0002592 A1 | 1/2002 | Aoki |
| 2002/0083114 A1 * | 6/2002 | Mazzagatte et al. ........ 709/100 |
| 2002/0087683 A1 * | 7/2002 | Szondy ....................... 709/225 |
| 2002/0116439 A1 * | 8/2002 | Someshwar et al. ........ 709/104 |
| 2002/0181010 A1 * | 12/2002 | Pineau ..................... 358/1.15 |
| 2002/0188646 A1 | 12/2002 | Terrill |
| 2003/0017805 A1 * | 1/2003 | Yeung et al. ................. 455/41 |
| 2005/0074246 A1 * | 4/2005 | Hayward et al. .............. 399/8 |
| 2005/0219607 A1 * | 10/2005 | Yamaguchi et al. ....... 358/1.15 |

FOREIGN PATENT DOCUMENTS

| | | |
|---|---|---|
| EP | 0893760 | 1/1999 |
| EP | 0936 808 | 8/1999 |
| EP | 0974890 | 1/2000 |
| GB | 2 342 197 | 4/2000 |
| GB | 2356321 | 5/2001 |
| WO | WO 01/33365 | 5/2001 |
| WO | WO 01/42894 * | 6/2001 |

OTHER PUBLICATIONS

Z. Pie, L. Weidong, W. Jing, W. Youzhen, "Bluetooth—The Fastest Developing Wireless Technology", IEEE, vol. 2, Aug. 21, 2000, pp. 1657-1664.

* cited by examiner

PRINT DEVICE AND PROGRAM PRODUCT FOR SUPPORTING PRINT BY REFERENCE METHODS

FIELD OF THE INVENTION

A field of the invention is devices and program products for printing documents. Other fields of the invention include print content services, wireless portable devices, and web-based services.

BACKGROUND OF THE INVENTION

Traditional print devices typically support the "pushing" of content to a print device from a second device. Most often, this involves a computer communicating with a print device. The communication may follow the format of a hard-wired connection interface, such as when a print device connects to a computer over a serial or parallel computer port. The communication might also follow a wireless connection such as that used for communication through an infrared light or radio frequency port. The basic operation in either case involves a device, e.g., a computer, linking to a print device, converting content into a format acceptable to the print device, and then transferring the content to the print device.

As an example, a computer printing a Microsoft Word document addresses a printer, converts the document data and format information into a printer ready format, and pushes the print content to the printer. The communication between the printer and the device is formatted according to protocols. Print servers that typically comprise software resident or cooperative with a data generating program translate the data into a printer format and otherwise convert print job data into a protocol useful for control of the print job.

Print devices for supporting these traditional models limit print operations in a number of disadvantageous manners. For example, one limitation relates to an inability of a print device to be used by second devices lacking means for converting data into a printer ready format. While this limitation may potentially be overcome by equipping the second device with a driver capable of translating the data, this is often impractical due to the number or size of drivers required to accommodate a variety of print devices and print jobs. This is particularly true for second devices having limited memory resources, such as portable devices like personal digital assistants (PDAs), cell phones, wireless data terminals, laptop computers, and the like.

These portable devices are faced with still additional limitations in using traditional print devices. Specifically, limited memory resources not only pose problems for storage of drivers, but likewise pose problems for storing content to be printed. Recent popularity of data files requiring relatively high memory resources such as graphics and photos, for instance, has further contributed to these problems. A proposed solution to these problems has been the addition of memory resources to the devices. This solution disadvantageously increases the cost, size, and weight of these devices, however. Additionally, even if these devices had the capacity to store more and larger data files for printing, they may face disadvantages associated with speed and reliability of communicating relatively large data files to a printer.

Advances in wireless communications have made these and other problems in the art more critical. Many portable devices such as cellular phones and PDA's can now communicate with one another as well as networked resources for widespread applications. By way of example, wireless communications may allow a user to connect with the Internet from a PDA or cell phone and surf websites. The problems discussed above, however, as well as others in the art have limited the practicality of such methods as the portable devices generally lack memory and communications resources for downloading, storing, and printing relatively large files.

Unresolved needs in the art therefore exist.

SUMMARY OF THE INVENTION

The present invention is directed to a print device for obtaining print content at the request of a client, as well as to a program product for causing a print device to obtain print content at the request of a client. Generally, a print device of the invention comprises a wireless communications port for receiving a reference from the client, with the reference comprising at least a location corresponding to print content, and a network communications port for communicating the reference to a network and for obtaining the print content from the location. A print device of the invention may further comprise a print engine for printing the print content, as well as a memory for storing program instructions and a processor for executing the instructions. The print device of the invention may be of particular utility when used with a client that comprises a portable device.

Preferably, the reference location comprises a network address corresponding to the print content, and more preferably the location further comprises a print server network address. With this more preferred element, program instructions cause the print device to determine the print server address from the reference and to communicate the reference to the server address where it will be resolved. Also, the print device may additionally communicate print device capabilities over the network communications port to the print server for formatting the print content.

Those knowledgeable in the art will appreciate that the present invention is well suited for practice in the form of a program product. Accordingly, an embodiment of the present invention comprises a program product comprising computer executable instructions stored in a computer readable medium that when executed cause a print device to print content at the request of a client. In an embodiment of a program product of the invention, the instructions when executed cause the print device to accept a wireless communications link from a client and to accept a reference communicated over the wireless link from the client, with the reference comprising at least a location for obtaining print content. The program instructions when executed further cause the print device to communicate with the content location, to obtain the print content therefrom, and to print the content.

It will be appreciated that the print device and the program product of the invention in their various embodiments solve many of the otherwise unresolved problems in the art. For example, print content is printed for a client such as a portable device by transfer of a reference from the client as opposed to transfer of the print content. In this general manner, embodiments of a print device as well as a program product of the invention allow for print content to be output without taxing memory or communication resources of the portable device.

The above brief description broadly sets forth some of the more important features and advantages of the present disclosure so that the detailed description that follows may be better understood, and so that the present contributions to the art may be better appreciated. There are, of course, additional features of the disclosure that will be described hereinafter that form the subject matter of the claims appended hereto. In this respect, before explaining embodiments of the disclosure in detail, it is to be understood that the disclosure is not limited in its application to the details of the construction set forth in the following description or illustrated in the drawings. The present invention may provide additional embodiments, as will be appreciated by those knowledgeable in the art. Also, it is to be understood that the phraseology and terminology employed herein are for description and not limitation.

DETAILED DESCRIPTION

Figure 1A:
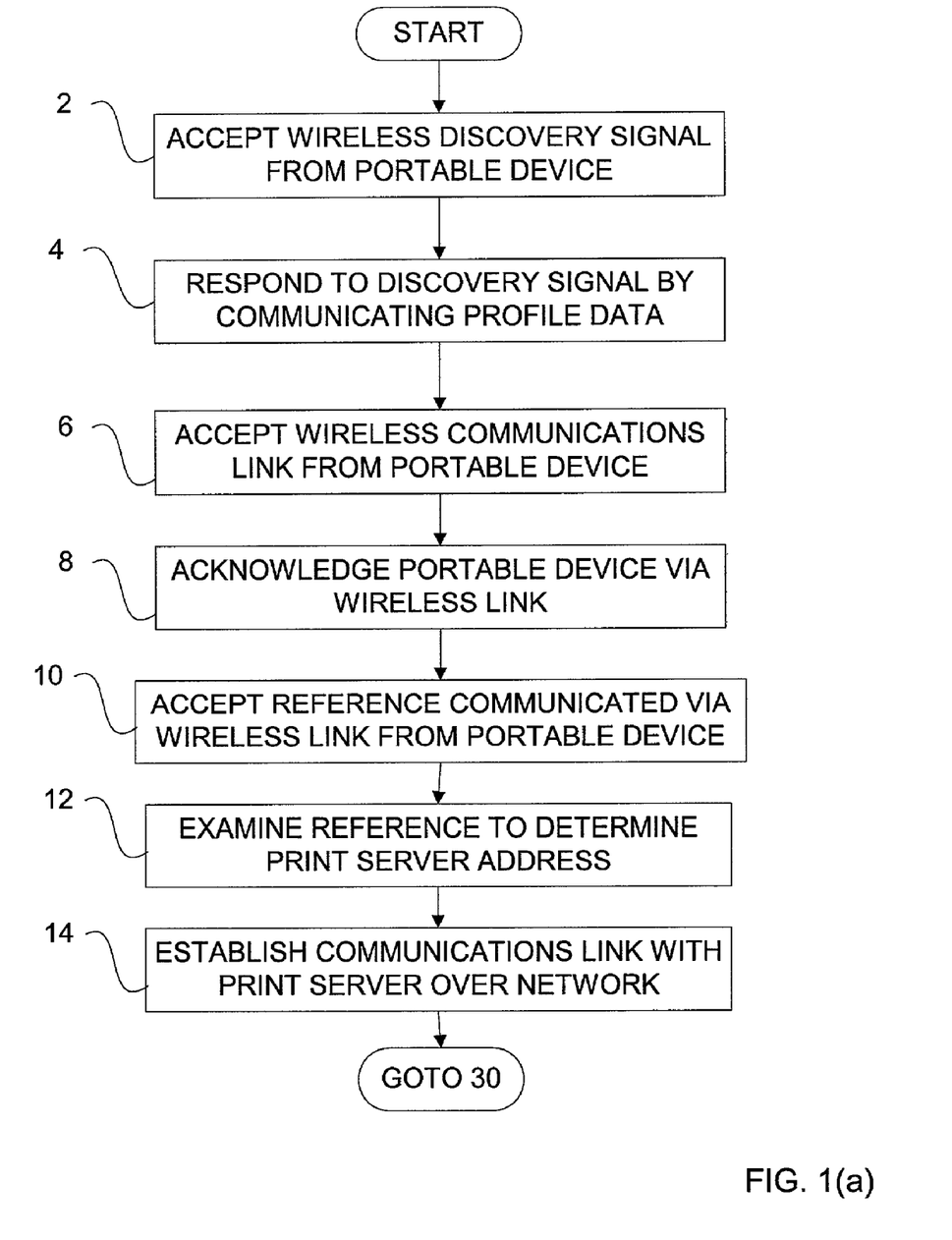
FIGS. 1(a)-1(c) are a flowchart useful for illustrating a computer program product embodiment of the invention.
Figure 1B:
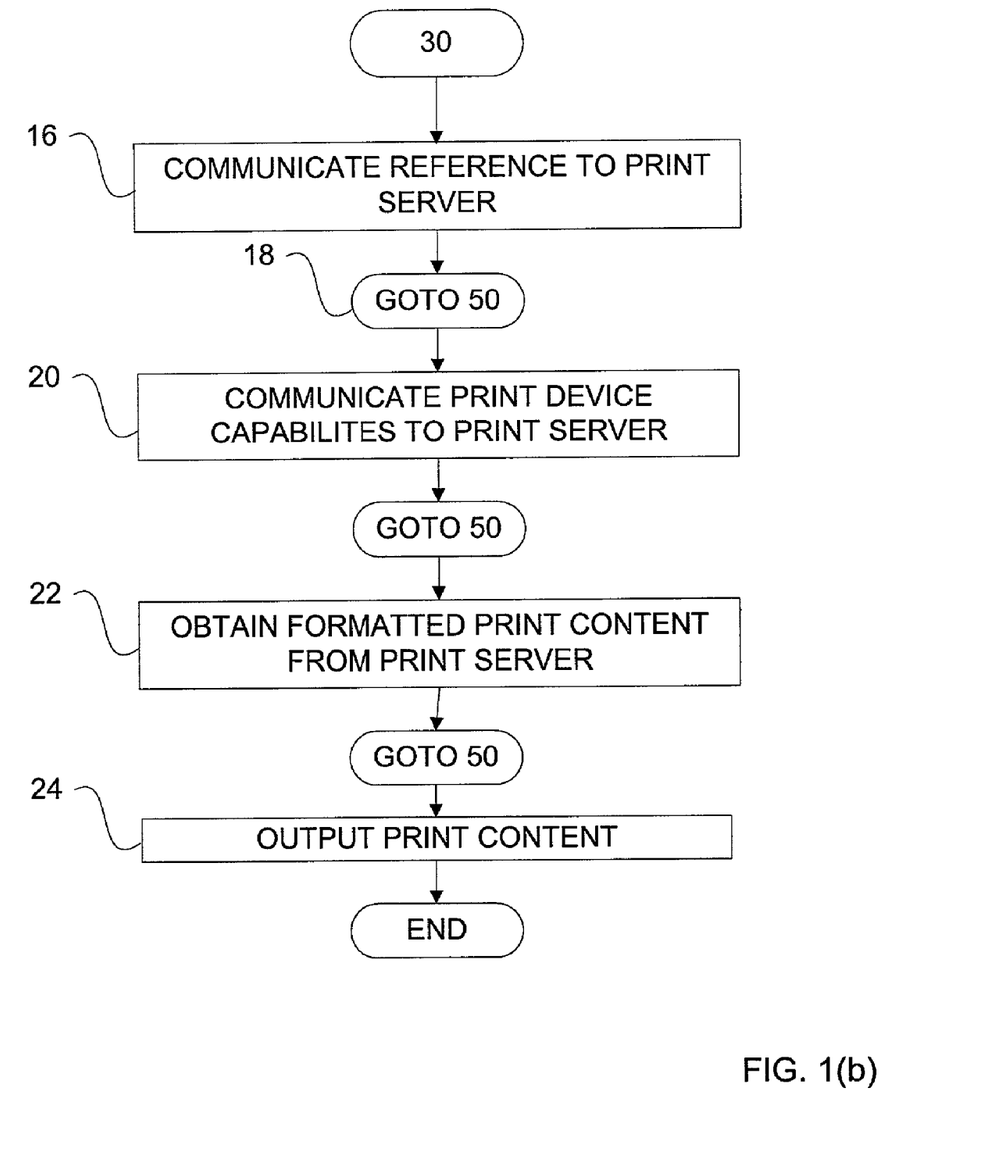
Figure 1C:
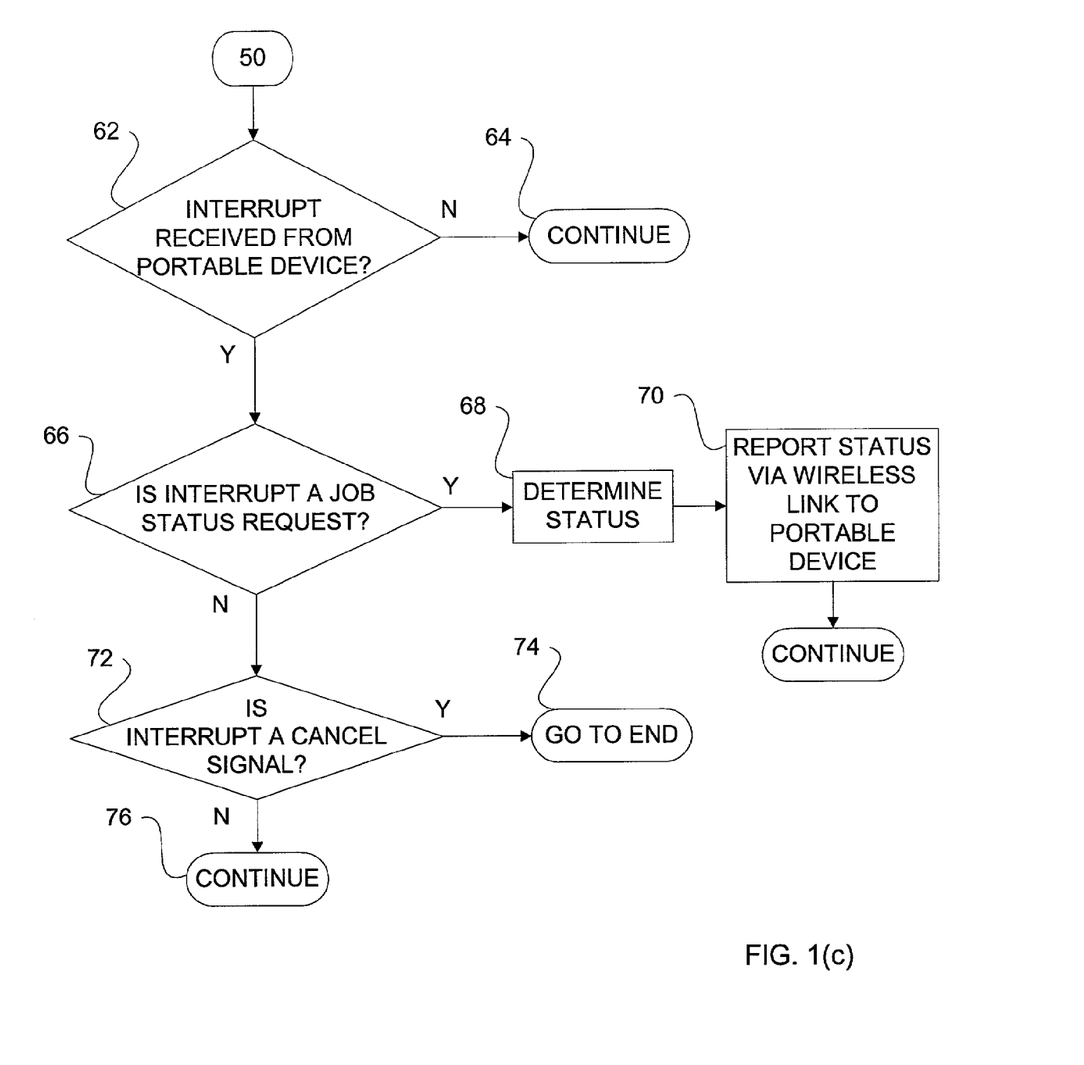
Figure 2:
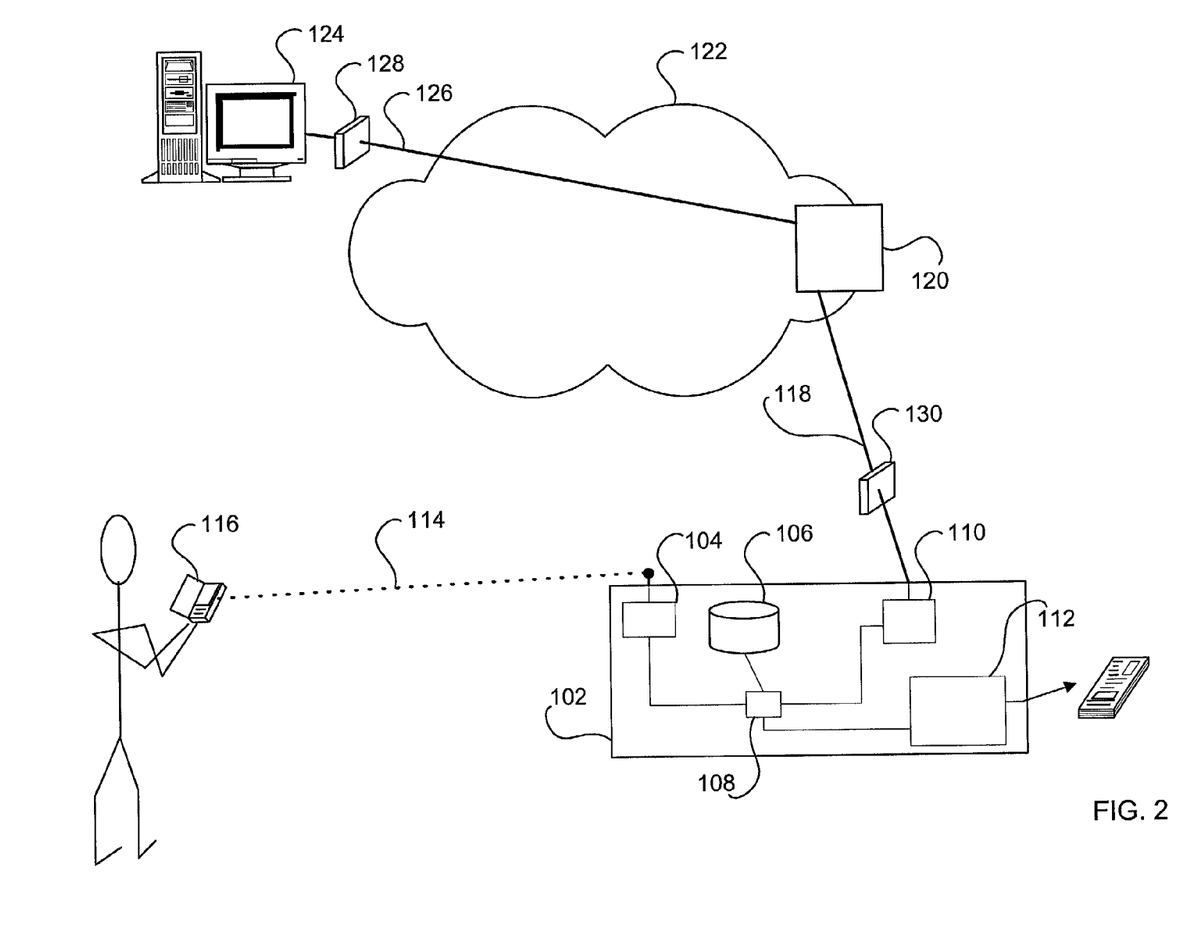
FIG. 2 is a schematic useful for illustration of an embodiment of a print device of the invention.
Figure 3:
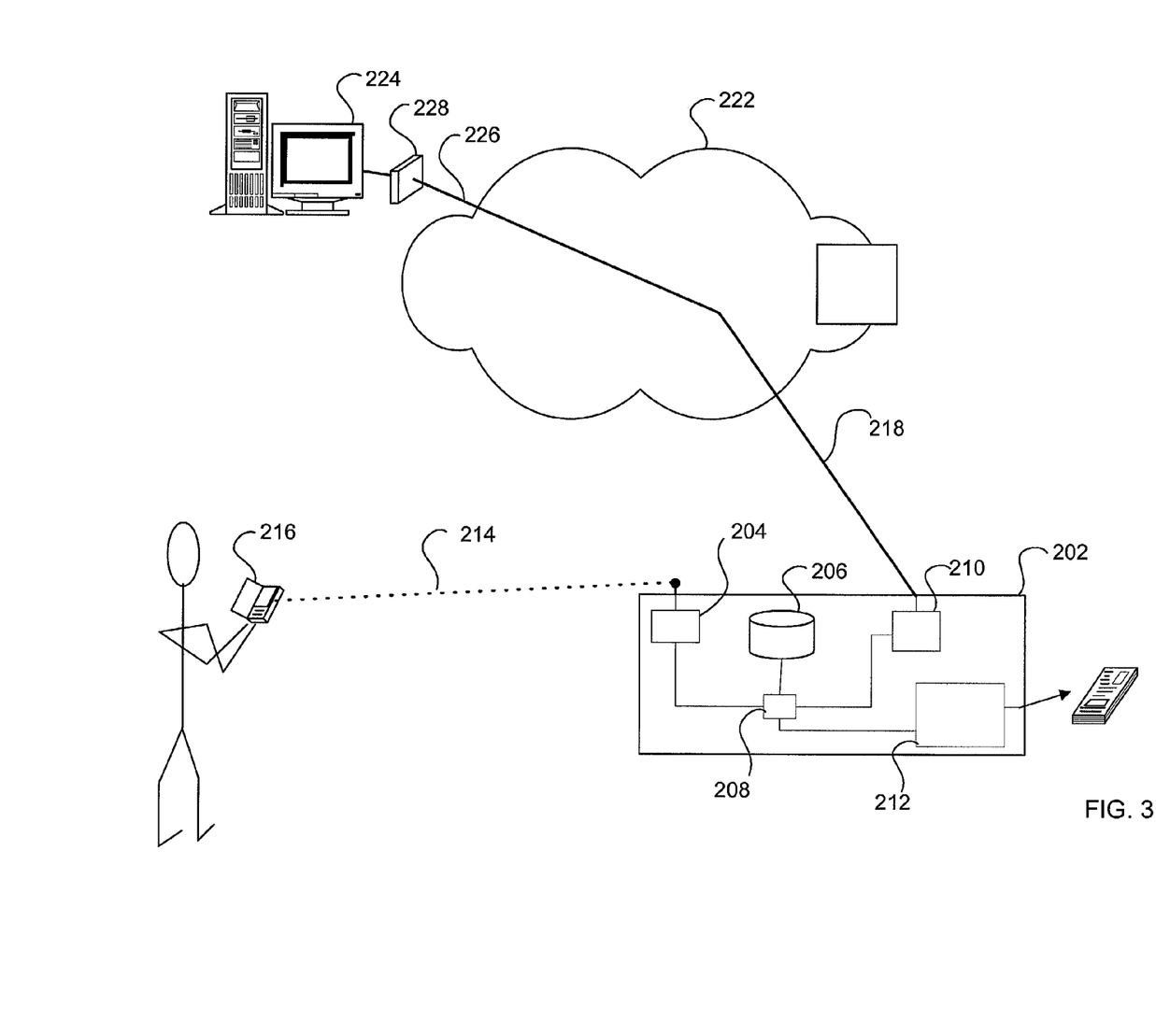
FIG. 3 is a schematic useful for illustration of a second embodiment of a print device of the invention.

Turning now to the drawings, FIGS. 1(a)-(c) are a flowchart illustrating a program product embodiment of the invention, while FIGS. 2-3 are schematics useful in illustrating print device embodiments of the invention. It will be appreciated that program product invention embodiments such as that illustrated by FIG. 1 may be useful for causing print device embodiments such as are illustrated in FIGS. 2-3 to take certain actions. That is, in practice, a program product embodiment of the invention may be of particular utility for use with a print device embodiment of the invention. Accordingly, the program product embodiment as illustrated in FIG. 1 will be discussed herein generally simultaneously with the print device embodiment of FIG. 2.

Program product embodiments of the invention comprise computer executable instructions embedded in a computer readable medium. The computer readable medium may comprise a magnetic or optical medium such as a disk, may comprise circuitry or micro circuitry embedded in chips, circuit boards or circuit cards, or the like. The program product may comprise instructions written in a programming language such as C++ or the like that have been compiled into a machine-readable format. Preferably, the program product is stored in a print device memory such as a memory 106 of a print device 102 of FIG. 2, for execution by a print device processor 108 to cause the print device 102 to take various actions.

The processor 108 comprises a device for executing the program instructions, with examples comprising microcircuitry embedded in chips that are widely commercially available. The memory 106 preferably comprises any of a variety of commercially available memory components, with examples comprising magnetic disks and other magnetic media, optical disks and media, circuitry and embedded circuitry, flash memory, PROM, EEPROM, and the like. Additionally, the program product could be stored remotely from a print device on a computer device communicating with a print device.

The program product embodiment illustrated in FIGS. 1(a)-(c) begins by accepting a wireless discovery signal communicated from a client (block 2). As used herein the term "client" is intended to refer to a device requesting that actions be taken. The client may comprise a portable device, with an example client device illustrated in FIG. 2 as a personal digital assistant ("PDA") 116. It will be appreciated that the print device of the present invention may be practiced with a wide variety of client devices, with portable electronic devices such as a PDA, a laptop or palmtop computer, a cell phone, portable terminal device, portable positioning systems, automobile based electronic devices, and the like as examples.

After receiving the discovery signal, the program instructions cause the print device to respond to the signal by communicating print device "profile" data to the portable device (block 4). The term "print device profile data" as used herein is intended to broadly refer to data regarding the print device availability and/or specifications. By way of example, print device profile data may comprise the physical location of the print device; a current wait time for the print device; print device capabilities such as color printing, two sided printing, print formats supported, type of paper; cost for printing; subscriber services supported; and the like.

Through these first program product steps, then, program product and print device embodiments may be used to offer portable device users important data regarding available printing options. For example, a portable device user wishing to print content may broadcast or otherwise communicate a wireless discovery signal that is received by a plurality of print devices within operable range of the portable device. Each of these print devices may then respond to the discovery signal by communicating device profile data to the portable device. The program product and print device embodiments would thereby allow the client user to choose which print device to select based on factors such as wait time, proximity, cost, capabilities, and the like.

In other program product embodiments, the program product may cause the print device to initiate a discovery process to identify client devices within operable range. By way of example, the program product may cause the print device to search out clients by broadcasting a beacon, broadcasting a printer profile, or the like; and recognizing an acknowledgement communicated by the client.

Once a print device has been chosen for use following the steps of discovery and response, the program product may cause the print device to accept a wireless communications link 114 from the portable device (block 6), and to communicate an acknowledgement to the portable device (block 8). By way of example, the acknowledgement may comprise a confirmation that the communications link has been established, a confirmation that the print device is capable of communicating via the wireless protocol with the portable device, a status indicator as to the availability of the print device to handle a print job, and the like.

Preferably, the program instructions cause the print device to receive the wireless communications link illustrated as link 114 in FIG. 2 using a wireless communications port 104. The wireless communications port 104 preferably comprises a wireless radio frequency port capable of transmitting and receiving wireless radio transmissions over an operable range of less than about 100 meters, and most preferably less than about 10 meters. A preferred example of a wireless communications port comprises a wireless radio frequency port for supporting "Bluetooth" protocol communications. Bluetooth is a wireless standard for short range communication developed by a technology industry consortium made up of 3Com, Ericsson, IBM, Intel, Agere, Microsoft, Motorola, Nokia, and Toshiba. More information, including protocol specifications, can be obtained on the Bluetooth website.

Other embodiments of program products and print devices of the invention may of course comprise wireless communications ports supporting other wireless communications protocols that may have other operable ranges. By way of example, wireless local area network ("WLAN") protocols as specified by the IEEE 802.11 standard may be used, which include infrared light communications as well as radio frequency. Detailed information regarding the IEEE 802.11 standard is available from the IEEE organization and on the web.

Those knowledgeable in the art will understand that the wireless port 104 may take the particular form of any of a number of physical embodiments, with a wide variety of components commercially available and suitable for use with a print device of the invention. These commercial products may comprise embedded circuitry cards or chips in combination with antennae elements for connection to a printer device serial or USB port, or peripheral BUS card, or the like. Those knowledgeable in the art will likewise appreciate that the wireless port 104 may comprise a component to be integrated in the print device 102 during its manufacture, with a wide variety of such components commercially available. Likewise, components may of course be manufactured specifically for use with a print device 102 of the invention, with manufacture specifications available for example by reference to the Bluetooth or IEEE 802.11 standards.

Once the communications link 114 has been established, the program instructions subsequently cause the print device 102 to accept a reference (block 10) transmitted over the wireless link 114 from the portable device 116. As used herein, the term "reference" is intended to broadly refer to a data set that at least identifies a location having print content for obtaining. Preferably, the reference comprises a network location such as a uniform resource locator ("URL"), and may further comprise a network address for a print server. A reference within the scope of the claimed invention may further comprise additional information.

For example, the reference may further comprise information regarding the data to be printed, such as the file size, the number of pages, the format, the colors, the dates of creation, the application used to create the data, print instructions and settings for various printers, and the like. Other reference information may further comprise "access information" such as a network path to the content, alternative path information, security information such as encryption keys or instructions, and the like. A reference may still further comprise billing information such as a cost for the content, an account code for payment, accepted forms of payment, and the like.

The program instruction embodiment illustrated in FIG. 1 causes the print device 102 to communicate the reference to a print server 120 for resolution. As used herein, the term "resolve" or "resolution" when used in regards to a reference is intended to broadly refer to the processing of the reference. By way of example, resolving the reference may comprise examining the reference to determine a print content network address, security information for accessing and obtaining the print content, alternate access paths, and the like. Further, resolving the reference may comprise acting on this information to ultimately obtain the print content.

As an initial step of communicating the reference to the print server, the program instructions cause the print device to determine the print server address (block 12). Preferably, this address comprises a URL for an Internet accessible print server. Internet based servers are preferred because of the relative ubiquitous presence and access to the Internet. The reference may comprise a print server address, or the print device 102 may otherwise receive the address communicated from the client 116. Alternatively, the program product may cause a server address stored on the print device memory 106 to be retrieved. By way of still further example, a program product embodiment may cause the print device to perform steps of print server discovery through queries to the network 122. Also, a plurality of print server addresses may be stored or contained in the reference so that alternate servers can be accessed upon the unavailability of a first server.

Once a print server address has been determined, the program instructions cause the print device to establish a communications link 118 with the server using a print device network communications port 110 (block 14). The network communications port 110 preferably comprises a commercially available network communications component. Those knowledgeable in the art will appreciate that there are a multiplicity of suitable network communications components available, with examples comprising components such as an Ethernet card for connection to a LAN or WAN; network communications components for connection to an ISDN, DSL, or the like; modem components for connection to telephone service, and the like. Further, the network connection port 110 may comprise a wireless port for supporting wireless communications such as cellular or satellite communications. Once the communications link 118 has been established with a print server 120, the program instructions next cause the print device 102 to communicate the reference to the print server 120 using the previously determined server address (block 16).

The program instructions then cause the print device 102 to begin a recurring process of checking for an interrupt signal communicated from the PDA client 116 that may comprise a status request, a job cancel signal, or the like (block 18). The term "interrupt" as used herein is intended to refer to a signal that an event has occurred. For example, an event such as a PDA user requesting a print job to be cancelled may be an event that would trigger transmission of an interrupt signal to the print device. An embodiment of a program product subset of steps for recognizing and processing such an interrupt is illustrated in the flowchart portion of FIG. 1(c).

The program instructions first cause the print device to determine whether an interrupt signal has been received (block 62). If an interrupt has not been received, the program instructions cause the print device to continue (block 64). If an interrupt has been received, the type of interrupt must be determined. Accordingly, the interrupt is examined to determine if it is a print job status request (block 66). If so, the program instructions cause the print device to determine the job status (block 68) and to report the status to the portable device client (block 70) via the wireless communications link with the client device. Those knowledgeable in the art will appreciate that status may be determined and reported in any of a number of manners.

For example, the program instructions may cause the print device to keep a "log" or other form of "history" of events that have occurred during the job, with the log or history referenced when desired to determine current status. As an additional example, the program instructions may query various components or checkpoints to determine job status. Regardless of the particular method, status data such as "print server contacted", "print content location contacted", "print content being formatted for printing", "pint content 40% loaded", and the like may be determined and reported to the PDA.

If the interrupt is not a job status request, the program instructions as illustrated by FIG. 1(c) further query the interrupt to determine if it is a job cancel signal (block 72). If so, the program instructions cause the print device to end the print job (block 74). A confirmation signal is preferably communicated to the portable device confirming that the print job has been cancelled. If the interrupt is not a status request or a cancel signal, the program instructions return to processing the print job (block 76). It will be appreciated that a variety of additional interrupt events could be comprised within the practice of the invention, and accordingly that other embodiments of the program product of the invention may comprise additional or alternative steps in processing these additional events. As illustrated by FIG. 1(b), it will be appreciated that these steps of interrupt detection and resolution will occur repeatedly throughout execution of the sequence of program steps.

In the program product embodiment illustrated in FIG. 1, the print server resolves the reference. As used herein, the term "resolve the reference" is intended to broadly refer to the processing of the reference. By way of example, resolving the reference may comprise examining the reference to determine a print content network address, security information for accessing and obtaining the print content, alternate access paths, and the like, as well as acting on this information to ultimately obtain the print content. That is, the print server will determine from the reference the print content network address, as well as other data from the reference such as security data, path data, encryption data, and the like that may be required to communicate with the location and to obtain the print content. With reference to FIG. 1, in resolving the reference the print server 120 will establish a communications link 126 with a print content location 124 and obtain the print content. In so doing, the print server 120 may determine from the reference required security data to penetrate a security mechanism such as firewall 128, which may be utilized for example to insure that downloads are authorized.

After the reference has been communicated to the server, the program instructions preferably cause the print device to communicate print device capabilities to the print server (block 20). As used herein, the term "print device capabilities" is intended to broadly refer to print device specifications that may be required to format print content for printing. As will be understood by those knowledgeable in the art and by way of example, print device capabilities may comprise what fonts and character sets a print device supports, what languages it supports, what sizes and types of materials may be printed on, what color and graphic capabilities it has, and the like. With knowledge of these print device capabilities, the print server 120 will be able to format the print content as may be required for printing by the print device 102.

In other program product embodiments, the program product may cause default print device capabilities to be communicated if capabilities are not available, or not available in sufficient detail for the print server. Or, the program product may respond to a discovery request from the print server by requesting default format print content to be prepared, with an example format comprising HTML.

Those knowledgeable in the art will appreciate that there are a variety of methods by which printer capabilities may be communicated to the server. By way of example, communicating the device capabilities may comprise retrieving and transmitting a capabilities file stored in the print device memory 106 to the server 120, may comprise communicating a print device identifier such as a device model number to the server 120, may comprise responding to queries or otherwise conducting a dialog with the server 120, or the like.

After communicating print device capabilities, the program instructions will cause the print device 102 to obtain the formatted print content (block 22). It will be appreciated that there are a number of manners in which the print content is finally obtained. Preferably, the program instructions cause the print device to recognize a communication from the print server 120 that the content is available, and may further cause the print device to recognize a network address or other identifier assigned to the formatted content by the server 120 and communicated to the print device 102. The program instructions may additionally cause the print device to obtain the formatted content from the indicated location.

Or, the program instructions may cause the print device to communicate instructions to the print server for obtaining the formatted print content. These instructions may comprise, by way of example, a command to download the print content, a command to send the print content to a specified address corresponding to the print device 102, or the like. This may be advantageous in penetrating security mechanisms such as firewalls 130 and the like that may otherwise pose problems. Once the print content has been obtained, the program instructions cause the print device 102 to print the content using a print engine 112 (block 24).

The term "print engine" as used herein is intended to refer to components that work together to deposit an image on a substrate. In general, a print engine may comprise a series of cooperating paper handling mechanisms and components such as arms, belts, trays, sensors, motors, positioners and the like; as well as image generating and depositing components and mechanisms such as ink or toner receptacles, nozzles, connectors, heaters, electric chargers, power supplies, pumps, valves, and the like. A print engine may utilize any of a variety of available technologies, including but not limited to ink jet, laser jet, photoelectric, and the like. In regards to ink jet printing by way of example, additional detail is available for description of a print engine in U.S. Pat. No. 4,728,963 issued to Rasmussen et al. and assigned to Hewlett-Packard, Corp., which is incorporated herein by reference.

It will be appreciated in consideration of the program product illustrated in FIG. 1 that the various program steps and sequence thereof have been illustrated to an extent in an arbitrary manner. That is, it will be appreciated that the steps could easily be performed in a different order within the scope of the invention. For example, program instruction steps such as checking for and acting on interrupts have been somewhat arbitrarily placed in the program product embodiment sequence. It will be appreciated that these steps could be carried out more or less frequently, and at different places within the program product sequence than illustrated. Those knowledgeable in the art will likewise appreciate that the various program steps illustrated could be carried out in a wide variety of particular manners, and that many alternatives to the exact program steps as discussed and illustrated exist within the scope of the invention. Other embodiments of the print device are also of course within the scope of the appended claims.

By way of example, a print device 202 may be comprised as illustrated by the schematic of FIG. 3 that is similar to the print device 102 of FIG. 2 in many respects. The print device 202, however, has a program instruction embodiment stored in a memory 206 that when executed by the processor 208 causes the print device 202 to resolve the reference that has been communicated from the PDA 216 over the wireless link 214. That is, this particular program product and print device embodiment function to obtain print content directly, 'or "pull"' content, from the location 224 without use of a print server intermediary. In causing the print device 202 to resolve the reference, the program instruction embodiment stored in the memory 206 may cause the print device 202 to determine the network address corresponding to the computer 224 having the print content stored thereon, to determine a path over the network 222, and to determine security data as may be required to penetrate a security mechanism such as a firewall 228 or the like. The program instructions further cause the print device 102 to obtain the print content from the location 224

In this embodiment of the print device and program product of the invention, the program product may cause the device 202 to format the print content for printing. Or, the program product may cause the device 202 to query the location 224 for print content that is pre-formatted to match the capabilities of the print device 202, and to obtain the corresponding preformatted content. In obtaining the print content, the print device 202 preferably communicates instructions to the location 224 for causing the location to communicate the print content.

In yet another example program product embodiment, a program product of the invention may cause the print device to accept user identification information communicated using the wireless link from the client portable device. User identification information may comprise identity information useful for billing, for example, with particular examples comprising a user name, code, account information, debit or credit card number, and the like. This information may be appended to a reference, may exist as a stand alone file communicated to the print device, or may be obtained through a discovery process between the print device and the client.

It will be appreciated that the particular components that have been discussed and illustrated in the print device embodiments 102 and 202 are intended for illustration of devices of the invention only, and are not intended to limit the scope of the invention as claimed. It is of course possible that other embodiments of print devices of the invention will have components and elements that while functionally equivalent to the various components illustrated herein, are different in appearance and/or name. By way of example, print devices of the invention may comprise more than one memory, more than one processor, and more than two communications ports. Further, various of these components could be functionally combined with one another in single combination components.

In particular, it is anticipated that a print device of the invention may comprise a printer into which a "plug-in" component is added that provides the functionality of a wireless communications port, a memory, and a processor. In this manner traditional printers of the prior art could be fitted with a single plug-in component to create a print device offering the various advantages of the present invention and that was within the scope of the present invention. Additionally, it will be appreciated that such a plug-in component may fall within the scope of the presently claimed invention.

Also, it will be appreciated that a "print device" as used herein is intended to broadly refer to electronic devices for causing an image to be deposited on a substrate. As such, "print devices" may comprise printers, copiers, scanners, multi-function machines and the like. Additionally, it will be appreciated that a program product embodiment of the invention could be stored and executed remotely from the print device to cause the device to take actions remotely.

The advantages of the disclosed invention are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims.

What is claimed is:

1. A print device for obtaining print content for a client device, the print device comprising:
   one or more communications ports operable to receive a reference from the client, said reference comprising at least a first network address identifying a location corresponding to the print content and a second network address for a print server, the first network address and the second network address being associated with different network devices, wherein the one or more communications ports are configured for use in communicating with the location and the print server;
   a memory storing executable program instructions for using one of said one or more communications ports to accept a communications link from a client and accept said reference communicated from said client, for determining said print server address from said reference, for communicating said reference to the second network address via one of the one or more communications ports so that said print server may resolve said reference to obtain the print content by utilizing the first network address to establish a network communications link with the location using the first network address, and for obtaining the print content from the print server; and
   a processor for executing said stored program instructions.

2. A program product for causing a print device to print content at the request of a client, the program product comprising executable instructions embedded in a computer readable medium that when executed cause the print device to:
   accept a communications link from the client;
   accept a reference input over said communications link from the client, said reference comprising a first network address identifying a location corresponding to the print content and a second network address for a print server, the first network address and the second network address being associated with different network devices;
   send the reference to said second network address so that said print server may resolve said reference to obtain the print content by utilizing the first network address to establish a network communications link with the location using the first network address;
   obtain the print content from said print server; and print the print content.

3. A program product as defined by claim 2, wherein when executed the program instructions further cause the print device to communicate an acknowledgement to the client after accepting said communications link.

4. A program product as defined by claim 2, wherein said communications link comprises a radio frequency communications link.

5. A program product as defined by claim 2, wherein the print device is of the type having a wireless communications port and a network communications port, wherein when executed the program instructions cause the print device to accept said communications link from the client via the wireless communications port and cause the print device to communicate with said print server via the network communications port.

6. A program product as defined by claim 2, wherein said location comprises a network address.

7. A program product as defined by claim 6, wherein said location comprises a URL address.

8. A program product as defined by claim 2, wherein the program instructions when executed cause the print device to accept an interrupt signal from the client over wireless communication link, and to respond to said interrupt signal by communicating data to the client via said communications link.

9. A program product as defined by claim 8, wherein said interrupt signal comprises a status request, and wherein the program instructions when executed cause the print device to determine a print job status after receiving said status request and wherein said data reported to the client comprises said print job status.

10. A program product as defined by claim 8, wherein said interrupt signal comprises a print job cancel signal, wherein the program instructions cause the print device to cancel the print job after receiving said cancel signal, and wherein said data reported to the client comprises a cancel confirmation signal.

11. A program product as defined by claim 2, wherein the program instructions when executed further cause the print device to accept user identification information communicated from the client via said communication link.

12. A program product as defined by claim 2, wherein the program product further causes the print device to:
   accept a discovery signal communicated by a wireless protocol from the client; and,
   respond to said discovery signal by communicating print device profile data to the client over said wireless protocol.

13. A program product as defined by claim 2, wherein the program product further causes the print device to:
   communicate a discovery signal to the client via a wireless communications protocol; and,
   recognize an acknowledgement communicated by the client in response to said discovery signal.

14. A program product as defined by claim 13, wherein said discovery signal comprises a print device profile.

15. A program product for causing a print device to print content at the request of a client, the program product comprising executable instructions embedded in a computer readable medium that when executed cause the print device to:
   accept a discovery signal communicated by a wireless protocol from the client;
   respond to said discovery signal by communicating print device profile data to the client over said wireless protocol;
   accept a wireless communications link from the client;
   accept a reference input over said wireless communications link from the client, said reference comprising at least a location corresponding to the print content a;
   directly communicate with said location;
   obtain the print content directly from said location; and
   print the print content;
   wherein said print device profile comprises physical location data for the print device and current wait time for the print device.

* * * * *